United States Patent
Bernhardt et al.

[11] Patent Number: 6,161,298
[45] Date of Patent: Dec. 19, 2000

[54] COORDINATE MEASURING APPARATUS HAVING A BRIDGE CONFIGURATION

[75] Inventors: Ralf Bernhardt; Volker Piwek, both of Aalen; Franz Woletz, Essingen; Klaus Jacobs, Königsbronn-Ochsenberg; Werner Leitenberger, Heidenheim, all of Germany

[73] Assignee: Carl-Zeiss-Stiftung, Heidenheim, Germany

[21] Appl. No.: 09/311,165

[22] Filed: May 13, 1999

[30] Foreign Application Priority Data

May 13, 1998 [DE] Germany .................... 198 21 274

[51] Int. Cl.[7] .................................................. G01B 5/004
[52] U.S. Cl. ................................................ 33/702; 33/503
[58] Field of Search .......................... 33/1 M, 503, 556, 33/702

[56] References Cited

U.S. PATENT DOCUMENTS

| | | | |
|---|---|---|---|
| 4,495,703 | 1/1985 | Sakata et al. ...................... | 33/1 M |
| 4,587,622 | 5/1986 | Herzog ................................ | 33/503 |
| 4,763,420 | 8/1988 | McCabe et al. ..................... | 33/702 |
| 4,958,437 | 9/1990 | Helms ................................. | 33/556 |
| 4,997,287 | 3/1991 | Tittl .................................... | 33/702 |
| 5,031,331 | 7/1991 | Herzog et al. ...................... | 33/503 |
| 5,195,826 | 3/1993 | Enderle et al. ..................... | 33/702 |
| 5,446,971 | 9/1995 | Neumann ........................... | 33/503 |
| 5,646,732 | 7/1997 | Gerlach ............................. | 33/503 |
| 6,058,618 | 5/2000 | Hemmelgarn et al. .............. | 33/503 |

*Primary Examiner*—G. Bradley Bennett
*Attorney, Agent, or Firm*—Walter Ottesen

[57] ABSTRACT

The invention is directed to a coordinate measuring apparatus in bridge configuration wherein a bridge spanning the measuring pad is guided on two guides laterally of the measuring pad. To avoid measurement errors, which are caused by different warming of the coordinate measuring apparatus, the guides are mounted on the support rods which have a low thermal coefficient of expansion and the support rods are arranged in a support structure.

17 Claims, 6 Drawing Sheets

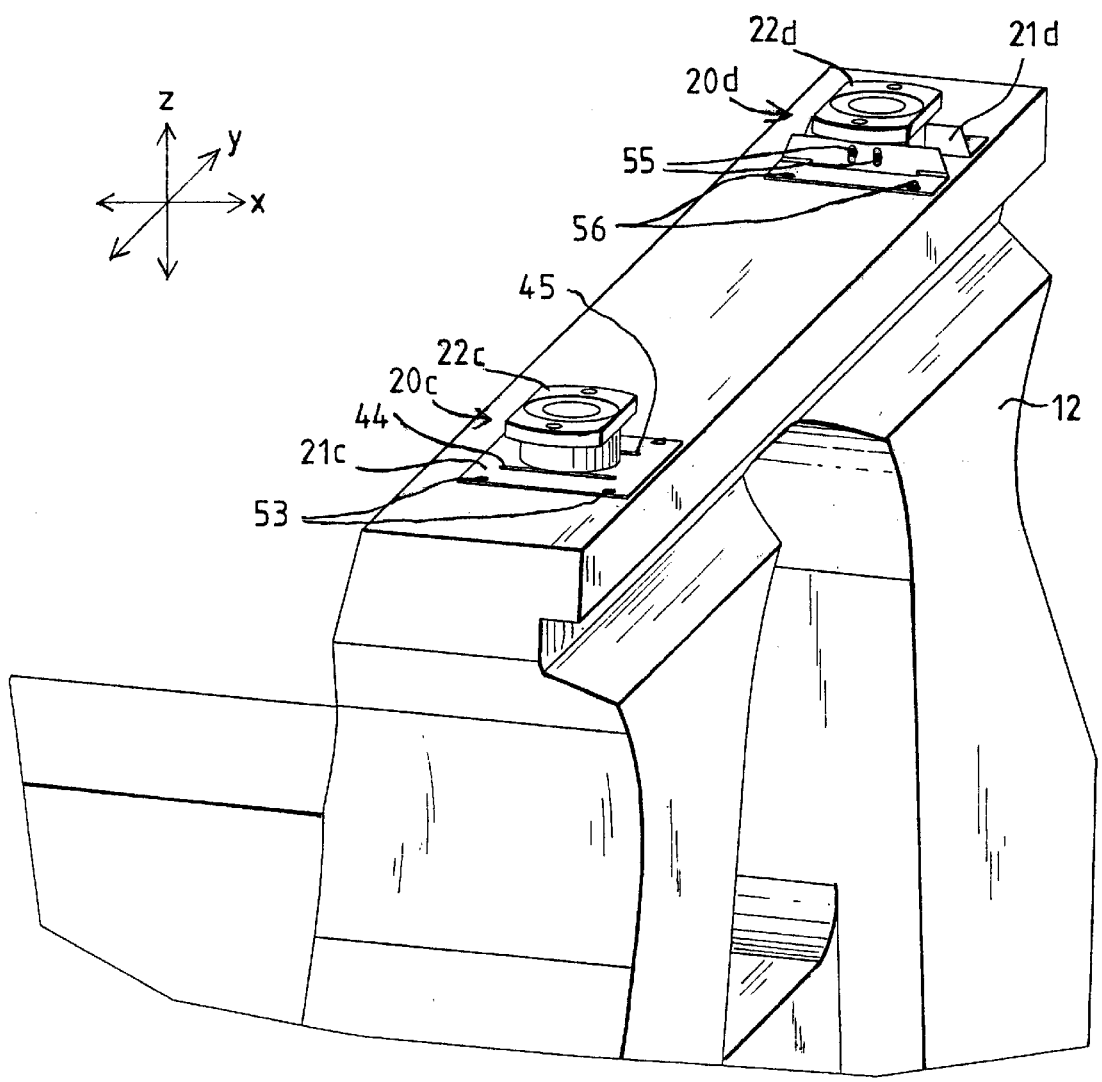

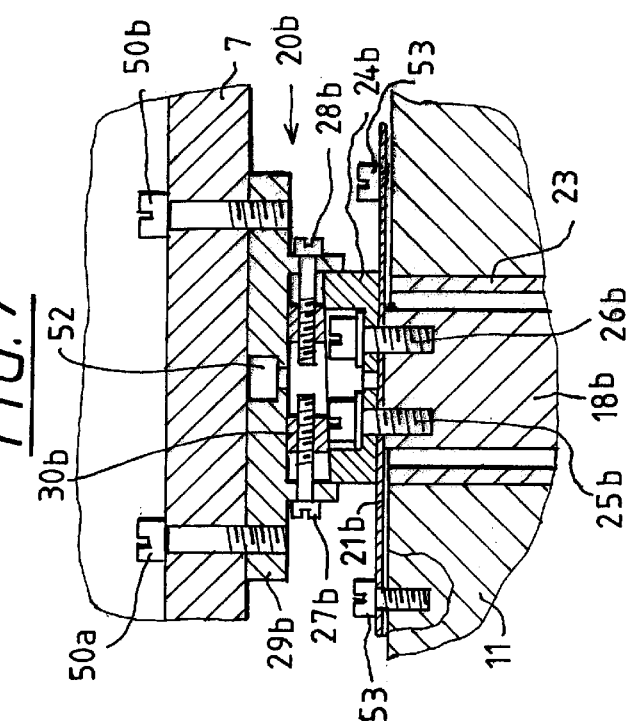
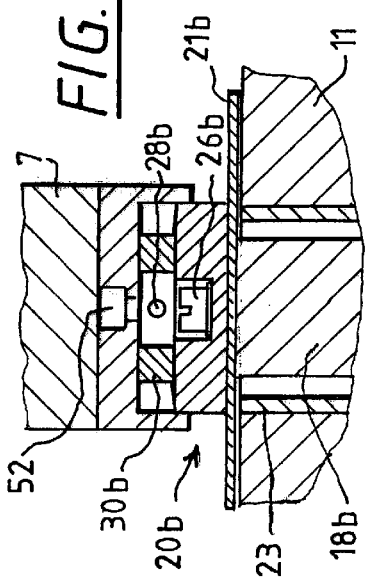
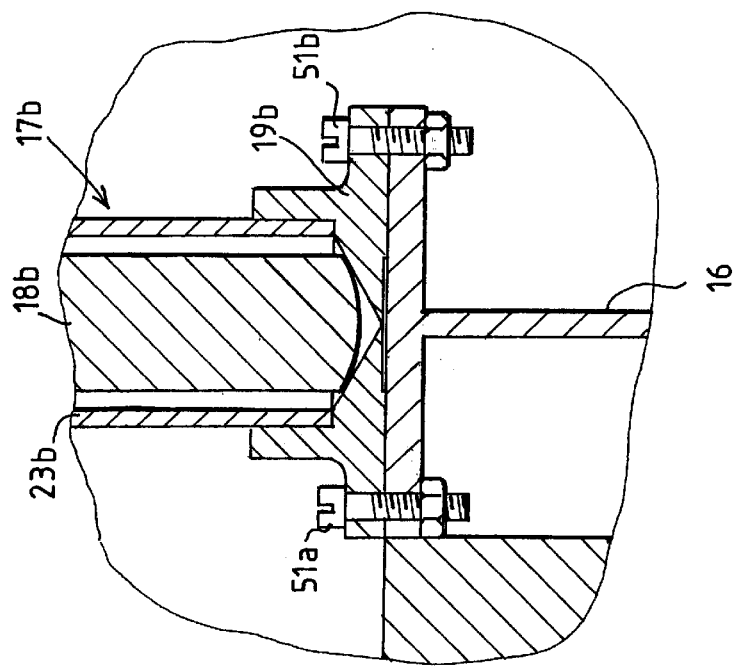

COORDINATE MEASURING APPARATUS HAVING A BRIDGE CONFIGURATION

FIELD OF THE INVENTION

The invention relates to a coordinate measuring apparatus having a bridge configuration wherein a bridge spans the measuring pad. The bridge is guided on two guides located laterally of the measuring pad.

BACKGROUND OF THE INVENTION

Bridge measuring apparatus of the above kind have been known for some time. These apparatus usually have lateral parts which are elevated relative to the measuring pad. A bridge is movably guided in the horizontal direction on the lateral parts and spans the measuring pad. A so-called transverse carriage is movably guided in a second horizontal coordinate direction along the bridge. The transverse carriage, in turn, movably guides a spindle vertically in the third coordinate direction. A probe is disposed at the lower end of the spindle and measurements of a workpiece clamped to the measuring pad can be made therewith.

Bridge measuring apparatus of this kind afford the special advantage relative to other coordinate measuring apparatus such as the portal measuring apparatus or the stand measuring apparatus in that the guides are clearly above the measuring pad so that they are relatively well protected against contamination. Coordinate measuring apparatus in bridge configuration are designed for use under rough ambient conditions such as in manufacturing because of this feature.

Nonetheless, coordinate measuring apparatus having a bridge configuration are relatively seldom utilized notwithstanding their special advantages because experience has shown that the lateral parts, on which the bridge is movably supported, expand differently with large temperature gradients so that the guides are no longer precisely horizontally aligned. This can lead to significant measurement errors.

SUMMARY OF THE INVENTION

It is an object of the invention to provide a coordinate measuring apparatus in bridge configuration with which the above measurement errors are avoided.

The coordinate measuring apparatus of the invention is in bridge configuration and includes: a measuring pad for receiving a workpiece thereon to be measured; a bridge; two guides for movably guiding the bridge; a thermally insulating support structure; a plurality of support rods mounted in the support structure for supporting the guides in elevation so as to permit the bridge to span the measuring pad; and, the support rods having a low thermal coefficient of expansion.

The basic idea of the invention is that the guides for guiding the bridge rest on column units having support rods which have a very low thermal coefficient of expansion and the column units are mounted in at least one thermally insulating support body.

With the support rods of the column units having a low thermal coefficient of expansion, the differences of the changes of length of the different supports are only very slight so that the guides always remain almost virtually horizontal. This is true even with large temperature differences in the room in which the coordinate measuring apparatus is set up. Because of the arrangement of the support rods in a thermally insulating support structure, the support rods are additionally thermally insulated by the support structure. This has especially the result of relatively slow warming and cooling and therefore small differences in temperature of the support rods so that the measurement errors are likewise considerably reduced.

The thermally insulating support structure can be made of several different materials. For example, a granite block can be used. However, it is especially advantageous to make the support structure from a mineral casting such as concrete or especially polymer concrete.

In addition to its thermal insulating characteristic, a mineral casting further has additional advantageous characteristics which are also used. For example, hollow pipes can be cast into the mineral casting when manufacturing the support structure. This is similar to an installation in a building. Electrical lines as well as pressurized air lines can be laid in a very simple manner in the empty tubes. Furthermore, a mineral casting and especially polymer concrete has excellent vibration-dampening characteristics which contribute especially advantageously to the measuring accuracy and to the speed of measurement.

Many different materials can be used for the support rods. Thus, the support rods can, for example, be made of CFK pipe which can be so wound with present day technology that it has a thermal coefficient of expansion of 0 $\mu$m/($°$ C.·m) or the support rods can be of Zerodur which likewise has a very low thermal coefficient of expansion. However, it has been shown that Invar steel can be advantageously used as a material for at least parts of the column units. Invar steel has a thermal expansion coefficient of approximately 1.5 $\mu$m/($°$ C.·m).

The support structure has a considerably higher thermal coefficient of linear expansion than the support rods. For this reason, the support rods should be movable in the vertical direction relative to the support structure. This can be realized in that corresponding bores can be provided, for example, in a granite block defining the support structure. The support rods can then be mounted in respective ones of the bores. If the especially advantageous mineral casting is used, then the movability is achieved in the vertical direction in that the support rods are not cast directly in the mineral casting; instead, a pipe is first cast in the mineral casting and the support rods are then mounted in respective ones of the pipes set in the cured mineral casting. The pipe can, for example, have a round or quadrilateral cross section.

Transverse forces and torques occur during movement of the bridge assembly. For example, if the transverse carriage is accelerated along the bridge, then a transverse force develops in response thereto. If the bridge is accelerated as a unit, then a torque occurs as a consequence thereof because a drive is provided at only one side of the coordinate measuring apparatus. These transverse forces and torques must be taken up by the support rods which, however, in practice, can lead to large elastic deformations of the support rods and therefore to significant measurement errors in view of the small diameter and long length of the support rods.

In an especially advantageous further embodiment of the coordinate measuring apparatus of the invention, at least one of the support rods is connected via a connector to the support structure in the region of the guide. The connector connects the support rod so that it is movable relative to the support structure in the vertical direction and immovable relative to the support structure in at least one horizontal direction. In this way, the support rod remains movable in the vertical direction relative to the support structure; whereas, in at least one horizontal coordinate direction, the transverse forces and the torques can be taken up by the support structure. For the connector, several different solutions are possible. For example, a pin can be attached to the support rod and engage in a corresponding vertically aligned slot in the support structure. The pin is thereby movable along the slot in the vertical direction; whereas, the support rod would be rigidly connected to the support body in the horizontal direction. However, the connector is especially advantageous as a punched or flame-cut sheet metal part correspondingly bent as required and as will be described hereinafter with respect to the drawings.

The support rods are advantageously seated on a frame in order to impart a high stiffness to the coordinate measuring apparatus. The frame can be made of various different materials but should have a relatively high stiffness. The frame advantageously has a high thermal conductivity so that, in addition, temperature differences between the individual support rods can be compensated relatively quickly. The frame is advantageously made of metal in order to achieve these characteristics. A frame made of wide flange steel beams welded one to the other is especially advantageous.

BRIEF DESCRIPTION OF THE DRAWINGS

The invention will now be described with reference to the drawings wherein:

FIG. 4 is a detail perspective view of the right lateral part of the support structure of the apparatus of FIG. 1;

FIG. 6 is a detail section view through a support bearing of the coordinate measuring apparatus of FIG. 1;

FIG. 7 is a detail section view of a connecting piece of the coordinate measuring apparatus of FIG. 1; and, FIG. 8 is a section view taken through the connecting piece of FIG. 7 rotated by 90° to the section view shown therein.

DESCRIPTION OF THE PREFERRED EMBODIMENTS OF THE INVENTION

Figure 1:
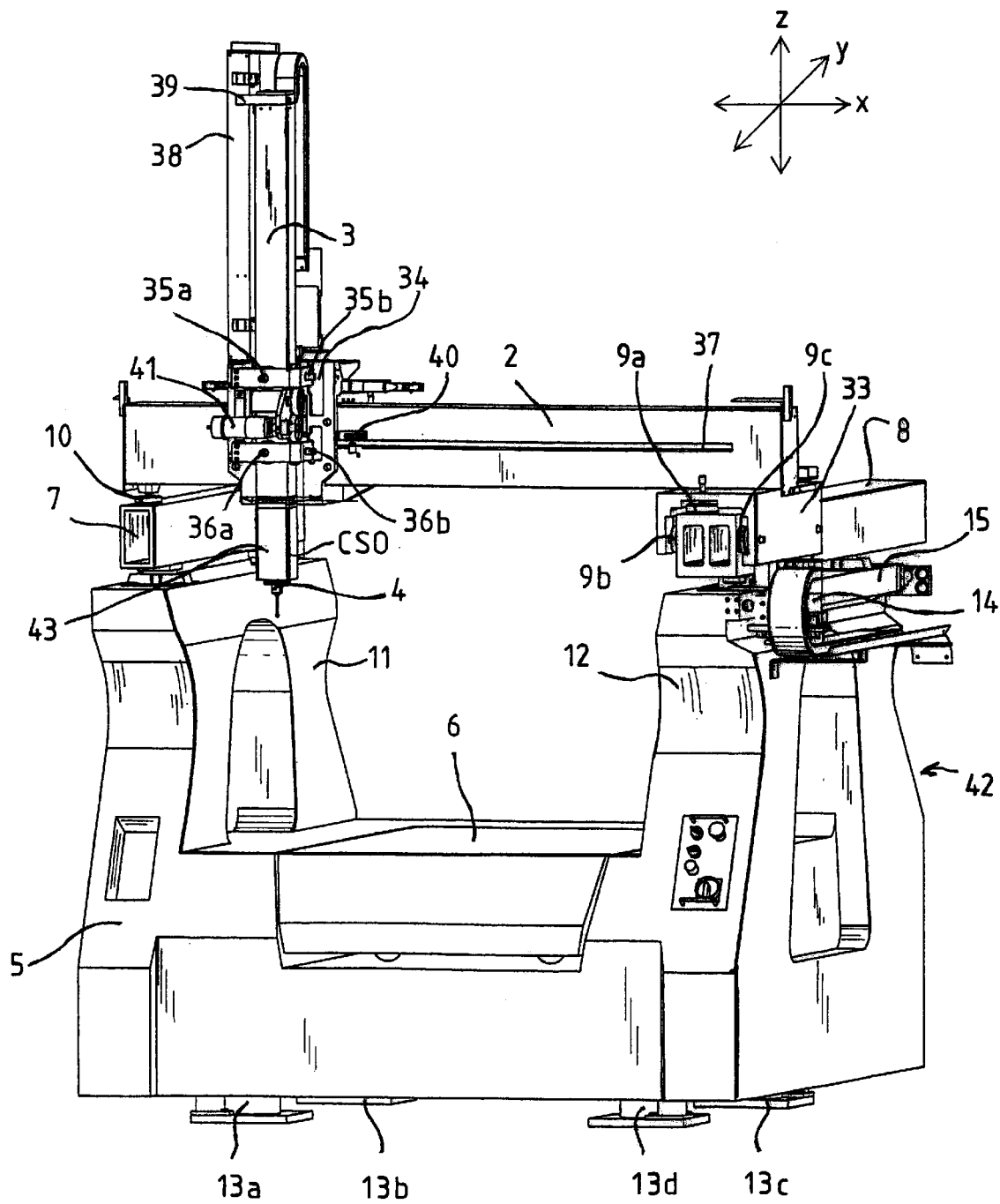
FIG. 1 is a perspective view of an embodiment of the coordinate measuring apparatus according to the invention.

FIG. 1 shows an embodiment of the coordinate measuring apparatus according to the invention in a bridge configuration. The coordinate measuring apparatus 1 has a substructure 42 which, from the outside, is essentially a support structure (5, 11, 12) cast of polymer concrete. The support structure (5, 11, 12) has three regions, namely, the lateral parts (11, 12) and the base part 5 which is supported relative to the floor via dampers (13a to 13d). A measuring pad 6 in the form of a measuring table is located at the center of the support structure (5, 11, 12). A workpiece (not shown), which is to be measured, is clamped to the measuring table.

Columns (not shown in FIG. 1) in the form of support rods are arranged in the lateral parts (11, 12) of the support structure (5, 11, 12). The guides (7, 8) are fixedly attached to the columns.

The bridge 2, which spans the measuring pad 6, is movably guided on the guides (7, 8). For this purpose, the bridge 2 is seated via an air bearing 10 on the guide 7. In contrast, on the opposite-lying side, a holder 33 is provided having a forward region in which three air bearings (9a to 9c) lie upon the guide 8. In the rear region (not shown) of the holder 33, there are likewise three air bearings which lie on the guide 8. In addition, a friction wheel drive 14 is connected to the holder 33. The friction wheel drive 14 has an electric motor which drives a corresponding friction wheel. The friction wheel is supported directly on a running surface 15 which is defined by a band under tension on the support structure (5, 11, 12) and thereby moves the bridge 2 when the electric motor is actuated. In addition, an optically scannable scale (not shown) is provided below the guide 8 and is scanned by an optical scanning probe (not shown) attached to the holder 33. In this way, the precise position of the bridge 2 is continuously detected in the direction of the guide 8 and evaluated. With the mechanics described above, the bridge 2 can be moved in a first horizontal coordinate direction along the axis identified by arrow y. The actual position of the bridge 2 can be continuously scanned in the particular direction.

In the same manner, the transverse carriage 34 is movably journalled on the bridge 2 via air bearings (not shown) so that the transverse carriage 34 can be moved in a second horizontal direction which is here given by the arrow x. The actual position of the transverse carriage 34 can be determined in the same manner via the scale 37 attached to the bridge 2 and the optical scanning probe 40 attached to the transverse carriage 34. The transverse carriage 34 is moved via a belt drive mounted on the rearward side of the bridge 2. The spindle 3 can, for example, have a quadratic cross section and is, in turn, movably journalled on all four outer sides via a total of eight air bearings (35a to 35d and 36a to 36d). Of these air bearings, air bearings (35c, 35d, 36c, 36d) are obscured and cannot be seen in FIG. 1. The spindle 3 can be driven via a friction wheel drive 41 and the precise position of the spindle can be obtained by scanning the scale 38 with an optical scanning probe 39 mounted on the spindle. The scale 38 is attached to the transverse carriage 34. The spindle 3 can thereby be moved in the direction of the arrow z, that is, in the vertical direction and therefore in the third coordinate direction.

A so-called scanning measuring probe head 43 is mounted at the lower end of the spindle and is exemplary. The probe head 43 accommodates the probe 4 which can be exchanged. The measuring probe head 43 can detect the deflection of the probe 4 in the three coordinate directions (x, y, z). When scanning the workpiece, the precise position of a point, which is to be scanned, on the workpiece can be determined via the deflection of the probe 4 from its rest position and via the positions of the bridge assembly in the three coordinate directions (x, y, z). The positions of the bridge assembly are scanned from the scales.

In lieu of the measuring probe head, a switching probe head can also be used, for example. With a switching probe head, a scanning pulse is generated as soon as the probe 4 is deflected out of its rest position. The probe head can also be an optical probe head. Also, the drives or the bearings can vary in many ways. For example, in lieu of the drives shown, spindle drives and the like or slide bearings, roller bearings et cetera can be used.

The configuration of the invention and especially of the substructure 42 will now be described in greater detail with respect to FIGS. 2 to 8.

Figure 2:
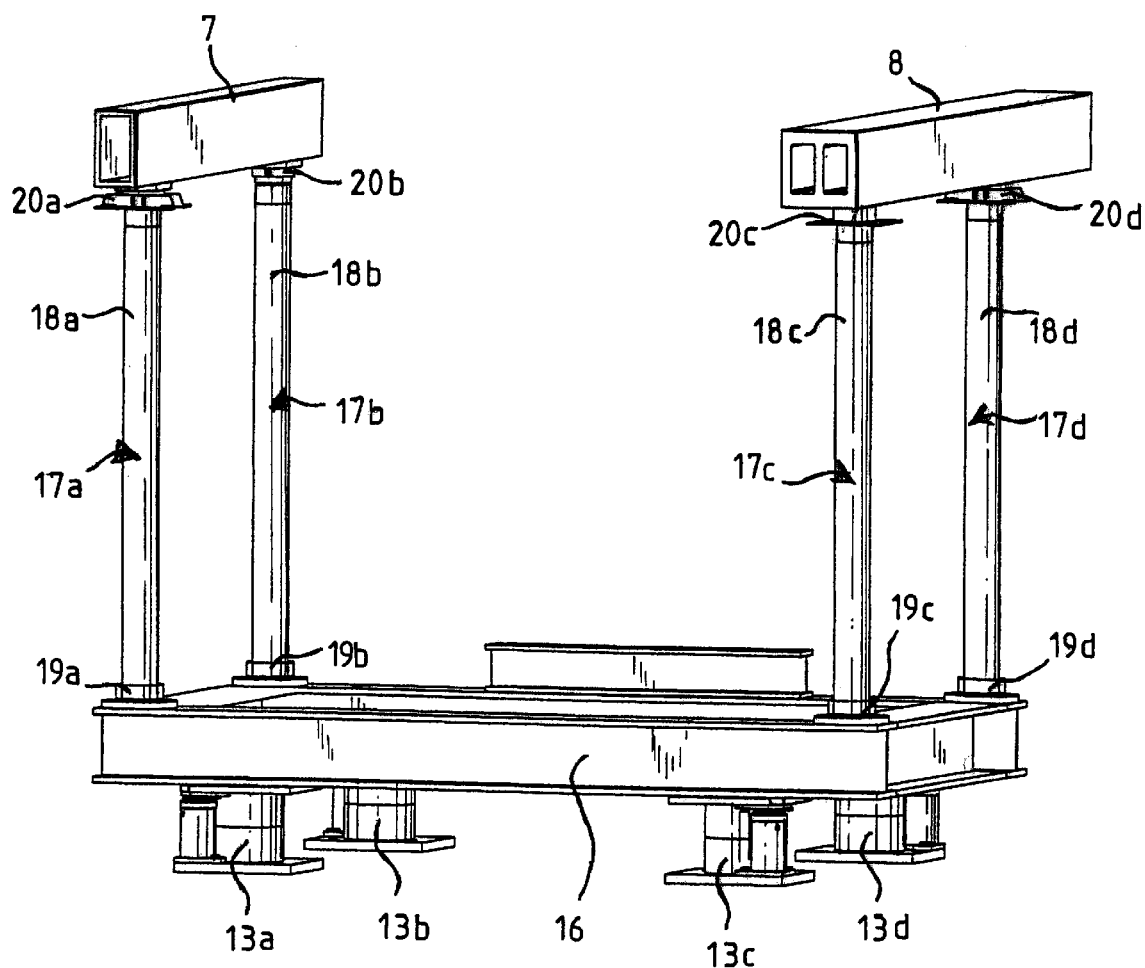
FIG. 2 shows essential components of the coordinate measuring apparatus of FIG. 1 which are, for the most part, mounted in the support structure of the apparatus.

FIG. 2 shows a frame assembly of the coordinate measuring apparatus shown in FIG. 1 wherein essential components can be seen some of which are arranged entirely in the support structure (5, 11, 12) of FIG. 1.

As shown in FIG. 2, the guides (7, 8) lie on column units (17a to 17d). The column units (17a to 17d) comprise respective support rods (18a to 18d) and respective support bearings (19a to 19d) on corresponding lower ends thereof. The support rods (18a to 18d) are mounted on the frame 16 via the support bearings (19a to 19d), respectively, so as to be tiltable. The frame 16 comprises four wide-flange steel beams which are welded together to have a contour corresponding to a rectangle. The frame produced in this way is cast directly into the base part 5 of the support structure (5, 11, 12) and serves to stiffen the support structure and especially to quickly compensate for temperature differences between the column units (17a to 17d). The frame 16, in turn, is mounted on the floor via four conventional vibration dampers (13a to 13d). Alternatively, three vibration dampers or more than four vibration dampers can be used.

The column units (17a to 17d) include the support rods (18a to 18d) which are journalled in the support bearings (19a to 19d), respectively, so that they can tilt. These column units (17a to 17d) are also provided with respective connecting pieces (20a to 20d) described hereinafter. The support rods (18a to 18d) have a low thermal expansion coefficient in accordance with the invention so that only slight differences in linear expansions occur for temperature differences between the support rods (18a to 18d). Accordingly, the guides (7, 8) are thereby virtually horizontally aligned even with large temperature differences. Invar steel has a thermal expansion coefficient of approximately 1.5 $\mu$m/(° C.·m) and is especially advantageous as a material at least for the support rods (18a to 18d).

Essential parts of the frame assembly shown in FIG. 2 are arranged in the support structure (5, 11, 12). The frame 16 is completely cast into the lower base part 5 of the support structure (5, 11, 12). In contrast hereto, the support rods (18a to 18d) are not directly cast into the support structure (5, 11, 12) because they must be freely movable relative to the support structure in the vertical direction, that is, in the direction identified in FIG. 1 by the arrow z. For this reason, hollow pipes (23a to 23d) are first cast in the support structure which can, for example, be of polymer concrete. The rods (18a to 18d) of the column units (17a to 17d) can then be mounted after the support structure (5, 11, 12) is produced.

Transverse forces and torques develop with the movement of the bridge 2 and of the transverse carriage 34. These transverse forces and torques must be taken up essentially by the guide 8 and therefore by the underlying column units (17c and 17d) because of the special form of the support. The transverse forces in the x and y directions and the torques about the z direction are especially transmitted to the guide 8 because the holder 33 is configured to have a U-shape and is supported via four bearings on the vertical sides of the guide 8; whereas, for the guide 7, no bearings operate on the vertical surfaces.

The transverse forces and the torques in the x-y plane can, however, hardly be taken up only by the rods (18a to 18d) because these rods are journalled on the frame 16 so that they can tilt. However, even if the rods (18a to 18d) would be fixedly attached to the frame, a considerable elastic deformation of the rods would occur because of the small diameter of the rods (18a to 18d) of the column units (17a to 17d) and the long length of the rods so that a large measurement error would occur.

For this reason, and as explained below in connection with FIGS. 3 and 4, the support rods are connected via connectors (21a to 21d) to the support structure (5, 11, 12) in the region of the guide. The connectors (21a to 21d) connect the support rods to the support structure (5, 11, 12) so that they are movable relative thereto in the vertical direction (that is, the direction identified in FIG. 1 by the arrow z) and connect the support rods in at least one horizontal direction (that is, in the direction identified by arrow x and/or arrow y in FIG. 1) so as to be immovable relative to the support body.

Figure 3:
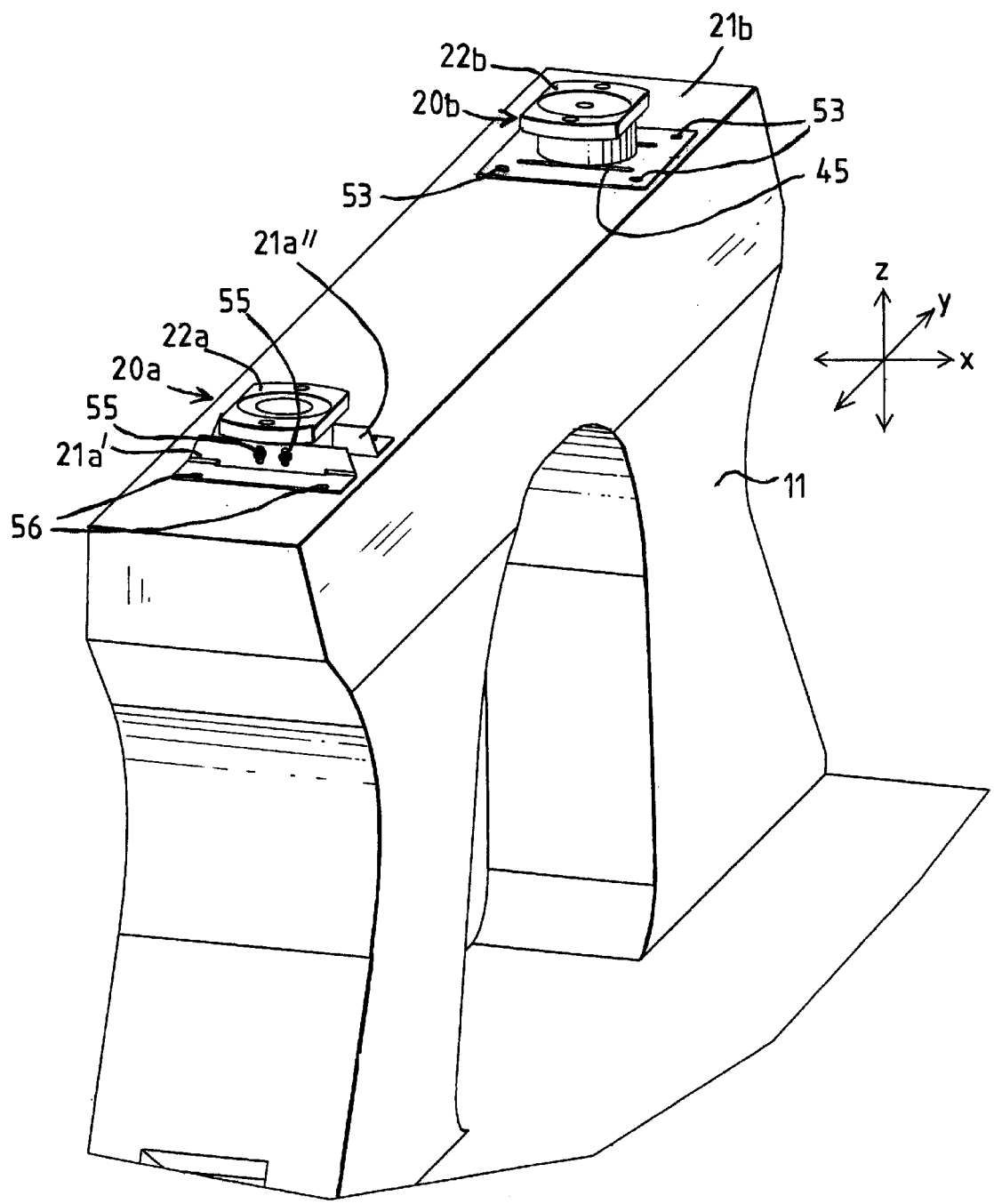
FIG. 3 is a detail view of the left lateral part of the support structure of the apparatus of FIG. 1.

The left lateral part 11 of the support structure (5, 11, 12) is shown in FIG. 3. The connecting piece 20a of the support rod 18a is connected via a two-part connector (21a' and 21a") in such a manner to the left lateral part 11 that the connecting piece 20a is movably connected in the vertical direction (arrow z) relative to the lateral part 11 of the support structure (5, 11, 12) and, at the same time, the connecting piece 20a is movably connected relative to the support structure in the direction identified by the arrow y. In contrast, in the horizontal direction identified by arrow x, the connecting piece 20a is immovable relative to the support structure (5, 11, 12). The connecting piece 20a is the only part of the column unit 17a that can be seen in FIG. 3.

The two-part connector (21a' and 21a") will be described with respect to FIG. 5a for one of the parts of the two-part connector (21a' and 21a"). The two parts are identical. FIG. 5a shows a perspective view of a part 21a' of a two-part connector (21a' and 21a"). First, the holes 48 and the slot 46 are punched into a sheet metal piece. Thereafter, the sheet metal piece is bent at right angles in the region of the slot 46.

The assembly of the connector (21a' and 21a") is as shown in FIG. 3 wherein the parts of the two-part connector (21a' and 21a") are each connected via bolts 55 through the slots 47 to the connecting piece 20a. The parts of the connector are so adjusted that the horizontal surfaces of the parts of the connectors (21a' and 21a") are spaced relative to the support structure in the millimeter range. Thereafter, the parts of the connector are tightened via the bolts 56 through the holes 48 to the support structure (5, 11, 12) so that, because of the spacing, the parts of the connector (21a' and 21a") are pretensioned in the manner of a leaf spring. In this way, the support rod 18a is pressed in the direction of the support bearing 19a. Furthermore, the support rod 18a is decoupled relative to the lateral part 11 of the support structure (5, 11, 12) in the direction identified by the arrow z so that the thermally caused length differences of the support structure (5, 11, 12) relative to the support rod 18a can become shorter or longer. In this way, the connector (21a' and 21a") movably journals the support rod 18a in the vertical direction relative to the support structure (5, 11, 12).

The slot 46 is punched into each of the two parts of the connector (21a' and 21a"). For this reason, a cutout is provided in the region of the connecting piece 20a between the vertical side of the connector (21a' and 21a") and the horizontal side of the connector (21a' and 21a") so that, for a displacement in the y direction, the connecting piece 20a can likewise bend the vertically aligned part of the connector (21a' and 21a"). In this way, the connecting piece (20a) too is movably journalled relative to the support structure (5, 11, 12) in one horizontal direction (that is, in the direction identified by the arrow y). The connecting piece 20a and therefore the support rod 18a is rigidly connected to the support structure (5, 11, 12) only in the horizontal direction identified by the arrow x.

The connector 21b is, in contrast, a second variation of a connector wherein the connecting piece 20b is connected rigidly to the lateral part 12 of the support structure (5, 11, 12) in the direction identified by arrow x as well as in the direction identified by the arrow y.

Figure 5B:
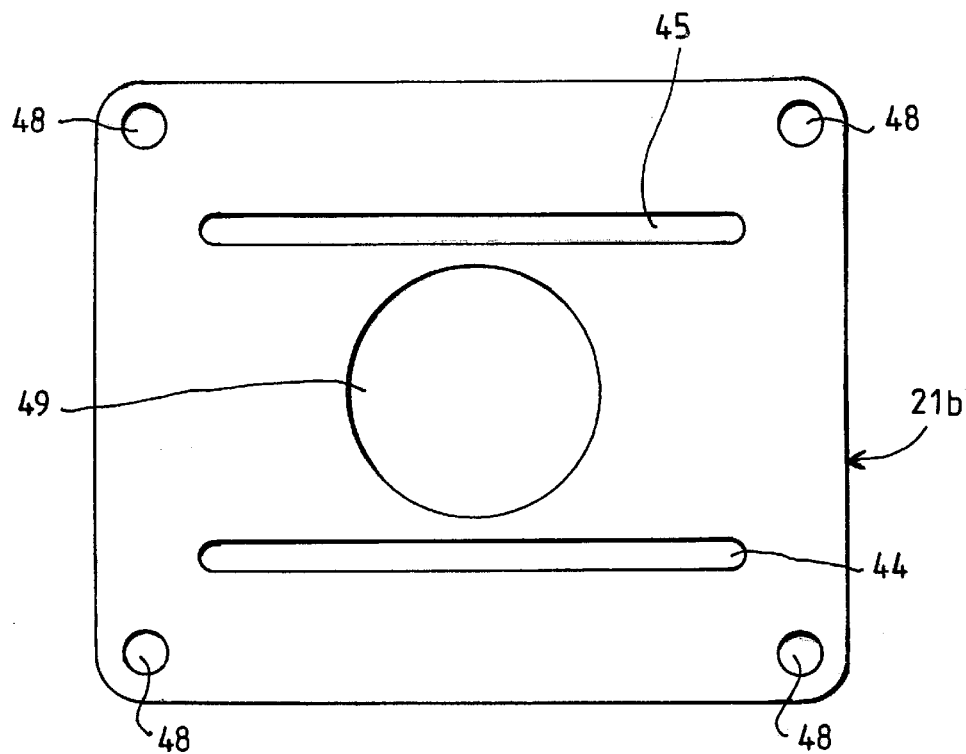
FIG. 5b is a detail plan view of a second connector.
Figure 5A:
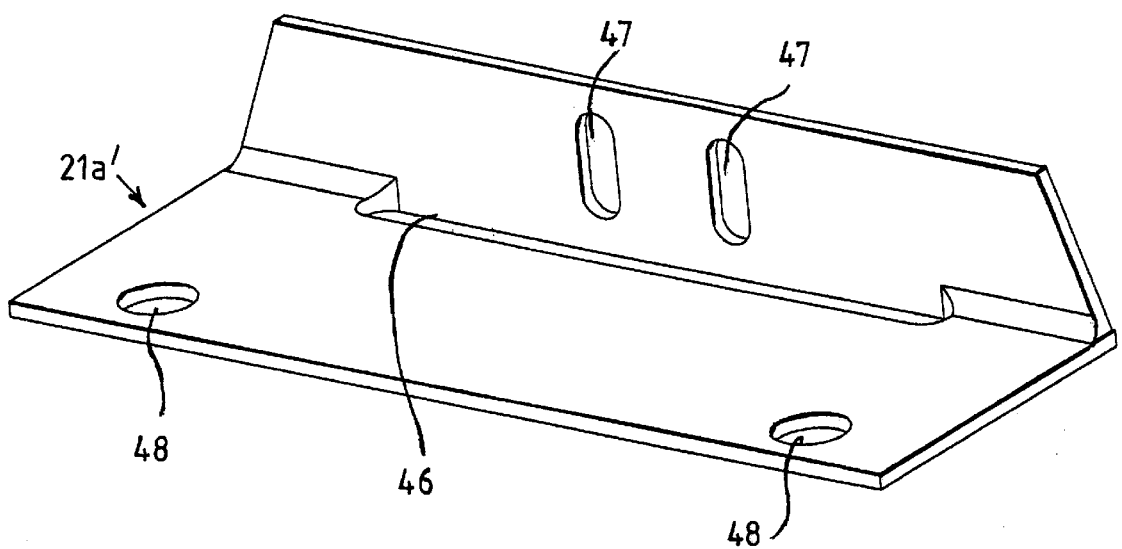
FIG. 5a is a detail perspective view of a first connector.

FIG. 5b is a plan view of the connector 21b. As shown in FIG. 5b, the connector 21b includes a sheet metal piece into which two longitudinal slots (44, 45), four holes 48 and a hole 49 have been punched. At its outer corners, the sheet metal piece is attached via bolts 53 through the holes 48 to the lateral part 11 of the support body (5, 11, 12); whereas, the connector is clamped in the space within the two slots between the rod 18b and the lower portion 24b of the connecting piece 20b via the bolts 25b and 26b (see FIG. 7).

The hole 49 is provided as a passthrough for the bolts (25b, 26b). The rod 18b and the support body (5, 11, 12) are likewise dimensioned so as to be spaced from each other so that the connector 21b, when the bolts 53 are tightened (after the connector 21b has been attached to the rod 18b), is tensioned in the manner of a leaf spring. With a movement of the connecting piece 20c relative to the lateral part 12 of the support structure (5, 11, 12), the connector 21b bends because of the slots (44, 45) so that the connecting piece 20b is movable relative to the support body (5, 11, 12) in the vertical direction (that is, in the direction identified by arrow z). The connecting piece 20c, and therefore the rod 18c, is rigidly connected to the support structure (5, 11, 12) in the horizontal plane (that is, in the direction identified by (x) as well as the direction identified by (y)).

FIG. 4 shows the right lateral part 12 of the support structure (5, 11, 12). As shown, the connecting piece 20d of the column unit 17d is connected to a connector (21d' and 21d") which is identical to the connector (21a' and 21a"); and, the connecting piece 20c of the column unit 17c is connected to a connector 21c identical to the connector 21a. With these connections, the connecting piece 20d and therefore the rod 18d is movably connected with the support structure in the directions identified by the arrows (y and z); whereas, the rod 18d is rigidly connected to the lateral part 12 of the support structure (5, 11, 12) in the direction identified by (x). Furthermore, the connecting piece 20c and therefore the rod 18c is connected to the support structure so as to be movable in the direction identified by the arrow (z); whereas, the support rod 18c is rigidly connected to the lateral part 12 of the support structure (5, 11, 12) in the directions identified by arrows (x and y).

The detailed assembly of the support bearings (19a to 19d) shown in FIG. 2 will now be explained with reference to FIG. 6.

In FIG. 6, a detail of the frame of FIG. 2 is shown in section and includes the support bearing 19b. As shown, the support bearing 19b is mounted on the frame 16 and is attached to the frame 16 via bolts (51a, 51b). In the interior of the support bearing, a conically-shaped cup is provided on which the rounded end of rod 18b of column unit 17b rests. The support rod 18b is thereby journalled on the frame 16 via the support bearing so that it can tilt. Accordingly, the support rod 18b can be aligned during assembly of the coordinate measuring apparatus without difficulty until it stands precisely vertical. In addition, and in contrast to FIG. 2, in FIG. 6 the pipe 23b can be seen into which the rod 17b of the column unit 18b is subsequently introduced after casting of the support structure (5, 11, 12). The pipe 23b is not shown in FIG. 2.

As indicated in FIG. 6, at least the frame 16, the dampers (13a to 13d), the support bearings (19a to 19d) as well as the pipes (23a to 23d) must be arranged in the polymer concrete form for casting the support structure. In this way, the support structure can be cast in the polymer concrete form.

The connecting piece 20b of the rod 17b of column unit 18b will now be explained in greater detail with respect to FIG. 7.

FIG. 7 shows a section through a portion of the coordinate measuring apparatus of FIG. 1 with the connecting piece 20b being shown in section. The connecting piece 20b has a lower portion 24b, an upper portion 29b as well as a ring 30b lying between the lower portion 24b and the upper portion 29b. The ring 30b as well as the lower part 24b are shown with respective inclined planes which lie one against the other. In addition, two threads are cut into the ring 30b into which the bolts (27b and 28b) threadably engage. By adjusting the bolts (27b, 28b), the ring 30b can be shifted in the horizontal direction along the bolt axes. If the ring 30b is located more in the direction of bolt 27b, then the upper part 29b drops relative to the lower part 24b because of the inclined planes. If, in contrast, the ring 30b shifts in the direction of bolt 28b, then the upper part 29b is lifted relative to the lower part 24b in correspondence to the inclined plane. Only the rod 18b (that is, its connecting piece 20b) has this mechanism so that at least one support of a column unit can be adjustable in elevation via the elevation adjustment (24b, 27b, 28b, 30b) and, to adjust elevation, an adjustable wedge is used.

The lower part is attached via the bolts (25b, 26b) to the rod 18b. The connector 21b is clamped between the lower part and the rod 18b as explained above.

The lower part is attached via the bolts (25b, 26b) to the rod 18b. The connector 21b is clamped between the lower part and the support rod 18b.

FIG. 8 likewise shows a section through a portion of the coordinate measuring apparatus 1 of FIG. 1. In FIG. 8, the connecting piece 20b is shown in section with this section view being rotated by 90° relative to the section of FIG. 7. As shown, the ring 30b lies on the lower part 24b. The lower part 24b has only a groove in the center for receiving the bolts (25b, 26b). In the region of this groove, the ring 30b does not lie against the lower part 24b. The ring 30b can be fixed by tightening the bolts (25b, 26b). Alternatively, the remaining hollow space in the connecting piece 20b can, after the proper adjustment of the ring 30b, be filled via the fill opening 52 with an adhesive so that the selected adjustment is then fixed.

It is understood that the foregoing description is that of the preferred embodiments of the invention and that various changes and modifications may be made thereto without departing from the spirit and scope of the invention as defined in the appended claims.

What is claimed is:

1. A coordinate measuring apparatus in bridge configuration, the coordinate measuring apparatus comprising:

a measuring pad for receiving a workpiece thereon to be measured;

a bridge;

two guides for movably guiding said bridge;

a thermally insulating support structure;

a plurality of support rods mounted in said support structure for supporting said guides in elevation so as to permit said bridge to span said measuring pad; and, said support rods having a low thermal coefficient of expansion.

2. The coordinate measuring apparatus of claim 1, further comprising:

a connector unit for connecting at least one of said support rods to said support structure in the region of one of said guides; and, said connector unit being configured to connect said one support rod to be movable in the vertical direction (z) relative to said support structure and so as to be immovable in at least one horizontal direction (x) relative to said support structure.

3. The coordinate measuring apparatus of claim 1, said support structure including a frame; and, at least one of said support rods having a lower end journalled on said frame.

4. The coordinate measuring apparatus of claim 3, further comprising a bearing mounted on said frame; and, said one rod being journalled in said bearing so as to be tiltable.

5. The coordinate measuring apparatus of claim 4, wherein said one support rod has a rounded lower end; and, said bearing has a concavely shaped recess for receiving said rounded lower end and tiltably journalling said one support rod therein.

6. The coordinate measuring apparatus of claim 3, wherein said frame is made of metal.

7. The coordinate measuring apparatus of claim 6, wherein said metal is steel.

8. The coordinate measuring apparatus of claim 1, wherein at least some of said support rods are made of Invar steel.

9. The coordinate measuring apparatus of claim 2, wherein said connector unit comprises a punched or flame cut piece of sheet metal.

10. The coordinate measuring apparatus of claim 3, further comprising a plurality of dampers for supporting said frame on a floor.

11. The coordinate measuring apparatus of claim 1, wherein at least one of said support rods defines a longitudinal axis; and, wherein said coordinate measuring apparatus further comprises an elevation adjusting device mounted on said longitudinal axis of said one support rod for adjusting the elevation of the guide relative to said support structure.

12. The coordinate measuring apparatus of claim 11, wherein said elevation adjusting device includes a wedge adjustable in a direction transverse to said longitudinal axis for effecting a change in said elevation.

13. The coordinate measuring apparatus of claim 1, further comprising a plurality of hollow pipes mounted in said support structure and corresponding to respective ones of said support rods; and, said support rods being mounted in corresponding ones of said hollow pipes.

14. The coordinate measuring apparatus of claim 3, wherein said support structure is a mineral casting.

15. The coordinate measuring apparatus of claim 14, wherein said frame is cast into said mineral casting.

16. The coordinate measuring apparatus of claim 3, wherein said support structure is a casting of polymer concrete.

17. The coordinate measuring apparatus of claim 16, wherein said frame is cast into said casting of polymer concrete.

\* \* \* \* \*